(12) United States Patent
Karuppasamy

(10) Patent No.: US 10,636,039 B2
(45) Date of Patent: Apr. 28, 2020

(54) METHOD OF GENERATING ONTOLOGY BASED ON PLURALITY OF TICKETS AND AN ENTERPRISE SYSTEM THEREOF

(71) Applicant: WIPRO LIMITED, Bangalore (IN)

(72) Inventor: Selvakuberan Karuppasamy, Chennai (IN)

(73) Assignee: Wipro Limited, Bangalore (IN)

(*) Notice: Subject to any disclaimer, the term of this patent is extended or adjusted under 35 U.S.C. 154(b) by 278 days.

(21) Appl. No.: 15/475,204

(22) Filed: Mar. 31, 2017

(65) Prior Publication Data

US 2018/0240125 A1 Aug. 23, 2018

(30) Foreign Application Priority Data

Feb. 17, 2017 (IN) .............................. 201741005774

(51) Int. Cl.
*G06F 16/28* (2019.01)
*G06F 16/36* (2019.01)
*G06Q 30/00* (2012.01)
G06F 40/20 (2020.01)
H04L 12/24 (2006.01)

(52) U.S. Cl.
CPC ......... *G06Q 30/016* (2013.01); *G06F 16/285* (2019.01); *G06F 16/367* (2019.01); *G06F 40/20* (2020.01); *H04L 41/5074* (2013.01)

(58) Field of Classification Search
CPC ... G06Q 30/016; G06F 16/367; G06F 16/285; G06F 40/20; H04L 41/5074
See application file for complete search history.

(56) References Cited

U.S. PATENT DOCUMENTS

| | | | |
|---|---|---|---|
| 7,505,989 B2 | 3/2009 | Gardner et al. | |
| 7,644,052 B1* | 1/2010 | Chang | G06N 5/022 |
| | | | 706/45 |
| 2004/0019601 A1 | 1/2004 | Gates | |
| 2007/0219992 A1 | 9/2007 | Bollinger et al. | |
| 2008/0104054 A1* | 5/2008 | Spangler | G06F 16/355 |
| 2011/0055699 A1* | 3/2011 | Li | G06F 16/951 |
| | | | 715/709 |
| 2014/0006861 A1* | 1/2014 | Jain | G06Q 30/01 |
| | | | 714/26 |
| 2014/0222419 A1* | 8/2014 | Romano | G06F 16/367 |
| | | | 704/10 |

(Continued)

*Primary Examiner* — James E Richardson
(74) *Attorney, Agent, or Firm* — Finnegan, Henderson, Farabow, Garrett & Dunner, LLP

(57) ABSTRACT

Disclosed herein is a method and system for generating an ontology based on plurality of tickets in an enterprise system 100. The method includes processing, by the enterprise system 100, input data associated with the plurality of tickets to obtain a structured data 228 associated with each of the plurality of tickets. Also, the method comprises performing multi-level clustering on the structured data 228 to obtain a plurality of clusters and corresponding error indicators, based on one or more parameters associated with the plurality of tickets. Further, the method comprises mapping each of the plurality of dusters with each of the error indicators, to obtain a mapped data at each cluster of the plurality of clusters and generating the ontology using the mapped data at each duster of the plurality of clusters, corresponding to the plurality of tickets.

15 Claims, 5 Drawing Sheets

(56) References Cited

U.S. PATENT DOCUMENTS

| | | | |
|---|---|---|---|
| 2015/0288557 A1* | 10/2015 | Gates | G06F 11/3006 |
| | | | 714/37 |
| 2016/0012818 A1 | 1/2016 | Faizakof et al. | |
| 2016/0042275 A1* | 2/2016 | Dettman | G06F 11/366 |
| | | | 706/46 |
| 2016/0217128 A1* | 7/2016 | Baum | G06F 17/2775 |
| 2017/0004208 A1* | 1/2017 | Podder | G06F 17/2785 |
| 2018/0005286 A1* | 1/2018 | Grabarnik | G06F 16/2477 |
| 2018/0189691 A1* | 7/2018 | Oehrle | G06N 5/02 |

* cited by examiner

METHOD OF GENERATING ONTOLOGY BASED ON PLURALITY OF TICKETS AND AN ENTERPRISE SYSTEM THEREOF

FIELD OF THE DISCLOSURE

The present subject matter is related, in general to an enterprise system, and more particularly, but not exclusively to a method and a system for generating an ontology based on a plurality of tickets.

BACKGROUND

In general, enterprises spend a significant amount of time and resources on help desk for resolving issues or tickets raised by users. The tickets are resolved by either employees or external users of an enterprise's services. The help desk provides support for resolving tickets and may resolve 5% to 20% of the incident tickets. The enterprises include Level 1 help desk employees for addressing IT issues. More recently, an enterprise help desk management provides virtual agents or automated solutions to resolve tickets. Such solutions accept a user query and provide information or a solution based on error symptoms given by a user.

To virtualize the Level 1 helpdesk, it may be required to accurately classify user problems or issues into a correct issue category. Also, predefined issue categorizations of incident management systems are usually not fine-grained, hence defining issue hierarchy needs to be done from scratch. This requires an increased amount of manual work to identify various issues under different applications, issue symptoms, and corresponding solution.

Enterprise help desk tickets history might provide valuable inputs in identifying the user problems and corresponding symptoms. Also, the enterprise help desk tickets history can be converted into an issue database. However, volume of the tickets is usually high for manual inspection of the tickets and to derive required information. One standard method for gathering insights from ticket history is data clustering. However, data clustering provides indicative clusters at a high level and lot of manual efforts are still required to obtain fine-grained clusters.

SUMMARY

Disclosed herein is a method of generating an ontology based on plurality of tickets in an enterprise system. The method includes processing, by the enterprise system, input data associated with the plurality of tickets to obtain a structured data associated with each of the plurality of tickets. Also, the method includes performing multi-level clustering on the structured data to obtain a plurality of clusters and corresponding error indicators, based on one or more parameters associated with the plurality of tickets. Further, the method includes mapping each of the plurality of clusters with each of the error indicators, to obtain a mapped data at each cluster of the plurality of clusters and generating the ontology using the mapped data at each cluster of the plurality of clusters, corresponding to the plurality of tickets.

Further, the present disclosure discloses an enterprise system for generating an ontology based on plurality of tickets in an enterprise system. The enterprise system includes a processor and a memory. The memory may be communicatively coupled to the processor. The memory stores processor-executable instructions. The instruction, upon execution causes the processor to process input data associated with the plurality of tickets to obtain a structured data associated with each of the plurality of tickets. Also, the enterprise system performs multi-level clustering on the structured data to obtain a plurality of clusters and corresponding error indicators, based on one or more parameters associated with the plurality of tickets. Further, the enterprise system maps each cluster of the plurality of clusters with each of the error indicators, to obtain a mapped data at each cluster of the plurality of clusters and generates the ontology using the mapped data at each cluster of the plurality of clusters, corresponding to the plurality of tickets.

Furthermore, the present disclosure discloses a non-transitory computer readable medium including instructions stored thereon that when processed by at least one processor cause an enterprise system to perform acts of processing input data associated with the plurality of tickets to obtain a structured data associated with each of the plurality of tickets. Also, performing multi-level clustering on the structured data to obtain a plurality of clusters and corresponding error indicators, based on one or more parameters associated with the plurality of tickets. Further, mapping each cluster of the plurality of clusters with each of the error indicators, to obtain a mapped data at each cluster of the plurality of clusters and generating the ontology using the mapped data at each cluster of the plurality of clusters, corresponding to the plurality of tickets.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
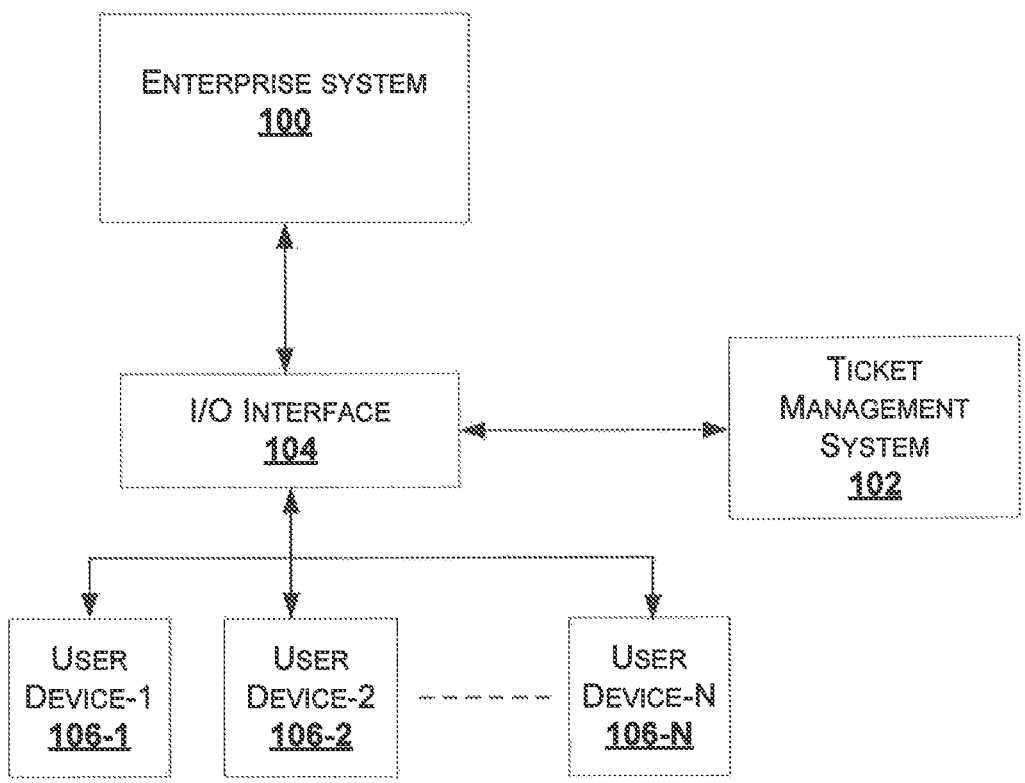
FIG. 1 shows an exemplary environment of generating an ontology based on a plurality of tickets in an enterprise system, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown or not.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "include(s)", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other dements or additional elements in the system or method.

The present disclosure relates to a method and an enterprise system for generating an ontology based on a plurality of tickets. The enterprise system may be configured to receive input data associated with the plurality of tickets to obtain a structured data associated with each of the plurality of tickets.

The input data may be data associated with at least one of ticket dump, one or more data sources of the enterprise system and user input data. The ticket dump includes at least one of a ticket identification (ID), a ticket number, a ticket title, a problem description, a resolution category and a resolution description associated with each ticket. The one or more data sources includes a ticket description, a resolution date and a resolution time.

Also, the enterprise system performs multi-level clustering on the structured data to obtain a plurality of clusters and corresponding error indicators, based on one or more parameters associated with the plurality of tickets. Further, the enterprise system maps each cluster of the plurality of clusters with each of the error indicators, to obtain a mapped data at each duster of the plurality of clusters and generates the ontology, also referred as taxonomy, using the mapped data at each cluster of the plurality of clusters, corresponding to the plurality of tickets.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment of generating an ontology based on a plurality of tickets in an enterprise system, in accordance with an embodiment of the present disclosure.

As shown in the FIG. 1, the exemplary environment includes an enterprise system 100 for generating an ontology based on a plurality of tickets. The ontology includes classifying and obtaining an interrelationship between the parameters corresponding to the plurality of tickets, in the enterprise system 100. The ontology is also referred as taxonomy. The enterprise system 100 is connected to at least one of a ticket management system 102, also referred as data source, and one or more user devices 106-1, 106-2, . . . , 106-N through an I/O interface 104. The one or more user devices 106-1, 106-2 . . . , 106-N together is referred as user devices 106, also referred as users.

In one embodiment, the enterprise system 100 is an automated computing system which generates an ontology based on a plurality of tickets, raised by one or more users. The enterprise system 100 receives input data associated with the plurality of tickets, using an input module (not shown in FIG. 1), from at least one of a ticket management system 102 and the one or more user devices 106-1, 106-2, . . . 106-N. The I/O interface 104, used by the enterprise system 100, may be at least one of remote procedure call (RPC), application programming interface (API), hypertext transfer protocol (HTTP), open database connectivity (ODBC) and the like.

The enterprise system 100 processes the input data to obtain a structured data associated with each of the plurality of tickets. The processing of the input data includes eliminating non-essential data from the input data, associated with each of the plurality of tickets, to obtain the structured data. Also, the enterprise system 100 performs multi-level clustering on the structured data to obtain a plurality of clusters and corresponding error indicators, based on one or more parameters associated with the plurality of tickets. Each of the plurality of clusters is a multi-level, that is formed at every level. Further, the enterprise system 100 performs mapping each cluster of the plurality of clusters with each of the error indicators, to obtain a mapped data at each cluster of the plurality of tickets, in an embodiment, the mapped data includes error indicators, also referred as error symptoms, corresponding to each of the plurality of tickets. Thereafter, the enterprise system 100 generates the ontology using the mapped data at each cluster of the plurality of clusters, corresponding to the plurality of tickets.

Figure 2:
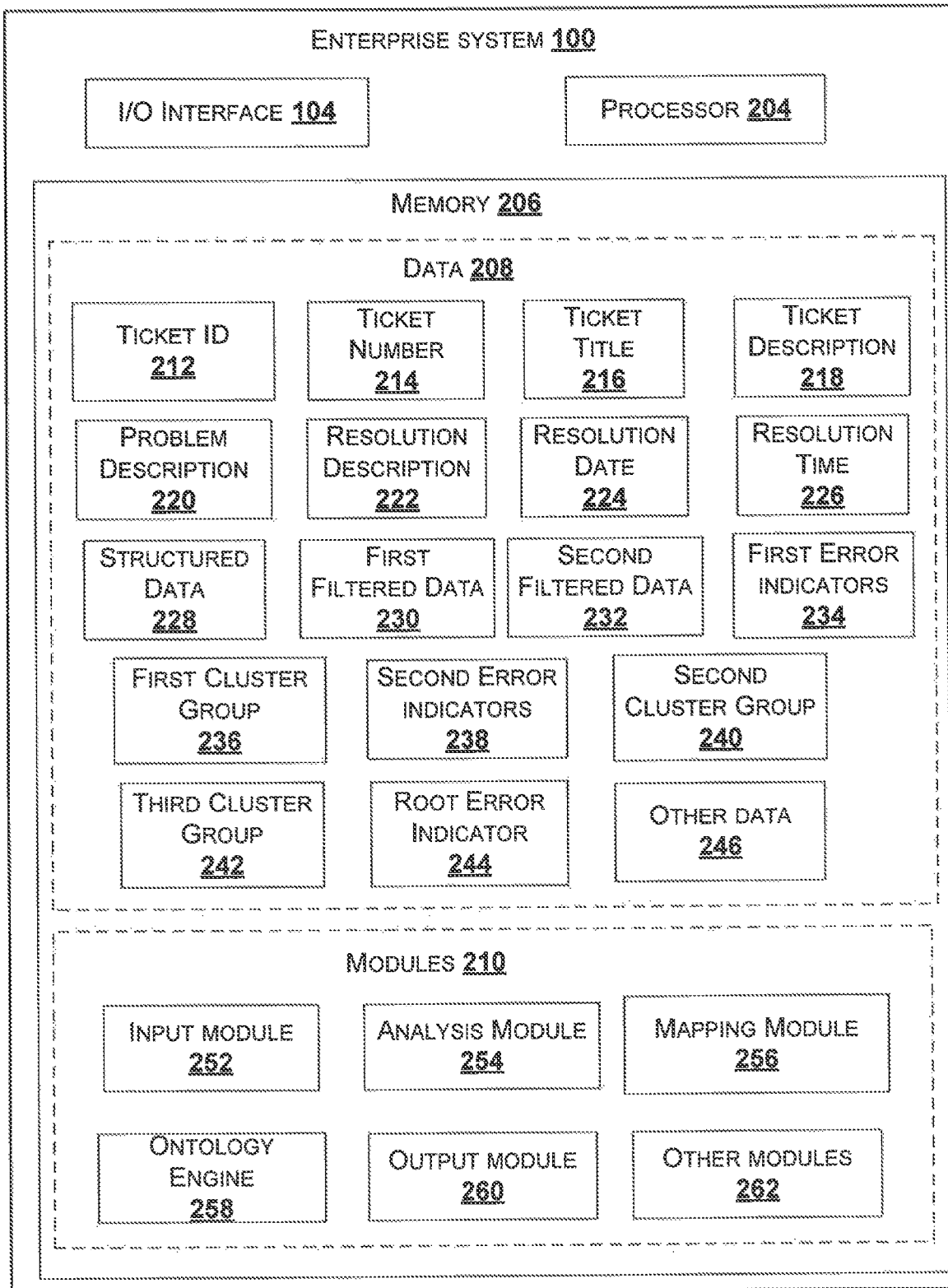
FIG. 2 shows a detailed Hock diagram illustrating an enterprise system for generating an ontology based on a plurality of tickets in an enterprise system, in accordance with an embodiment of the present disclosure.

FIG. 2 shows a detailed block diagram illustrating an enterprise system 100 for generating an ontology based on a plurality of tickets, in accordance with an embodiment of the present disclosure.

The enterprise system 100 includes an I/O interface 104, a processor 204 and a memory 206. The I/O interface 104 may be configured to read and retrieve data from at least one of the ticket management system 102 and the one or more user devices 106. The memory 206 may be communicatively coupled to the processor 204. The processor 204 may be configured to perform one or more functions of the enterprise system 100 for generating an ontology based on a plurality of tickets. In one implementation, the enterprise system 100 may include data 208 and modules 210 for performing various operations in accordance with the embodiments of the present disclosure. In an embodiment, the data 208 may be stored within the memory 206 and may include, without limiting to, a ticket identification (ID) 212, a ticket number 214, a ticket title 216, a ticket description 218, a problem description 220, a resolution description 222, a resolution date 224, a resolution time 226, a structured data 228, first filtered data 230, second filtered data 232, first error indicators 234, first cluster group 236, second error indicators 238, second cluster group 240, third cluster group 242, root error indicator 244 and other data 246.

In some embodiments, the data 208 may be stored within the memory 206 in the form of various data structures. Additionally, the data 208 may be organized using data models, such as relational or hierarchical data models. The other data 246 may store data, including temporary data and temporary files, generated by modules 210 for performing the various functions of the enterprise system 100.

In an embodiment, an input data to the enterprises system 100 may be data associated with at least one of ticket dump, one or more data sources and user input data. The ticket dump includes at least one of a ticket ID 212, a ticket number 214, a ticket title 216, a problem description 220, a resolution category and a resolution description 222 associated with each ticket of the plurality of tickets. The one or more data sources, is a predefined support level of the enterprises system 100, including a ticket description 218, a resolution date 224 and a resolution time 226.

In an embodiment, the ticket dump is the data associated with the plurality of tickets, that may be stored in the memory 206, for a predefined time. The predefined time for which the ticket dump is stored in the memory 206 of the enterprise system 100 may be in the range of one month to six months. Also, each of the plurality of tickets in the ticket dump includes a problem description 220, and a resolution description 222. Further, each of the plurality of tickets in the ticket dump further includes resolution date 224, resolution time 226 and any other optional data associated with each of the plurality of tickets.

The one or more data sources, is a predefined support level of the enterprises system 100, such as, but not limited to, level 1 (L1) and level 2 (L2) resources for resolving the tickets assigned. The data sources include parameters such as, but not limited to, resolution date 224, resolution time 226 and the like.

In an embodiment, the data 208 may be processed by one or more modules 210 of the enterprise system 100. In some implementation, the one or more modules 210 may be stored with the memory 206. In another implementation, the one or more modules 210 may be communicatively coupled to the processor 204 for performing one or more functions of the enterprise system 100. The modules 210 may include, without limiting to, an input module 252, an analysis module 254, a mapping module 256, an ontology engine 258, output module 260 and other modules 262.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 262 may be used to perform various miscellaneous functionalities of the enterprise system 100. It will be appreciated that such modules 262 may be represented as a single module or a combination of different modules.

In an embodiment, the input module 252, may be responsible for providing input data to the enterprise system 100. The input module 252 interacts with at least one of the ticket management system 102, one or more user devices 106 and one or more data sources, through the I/O interface 104 and receives the input data.

Figure 3A:
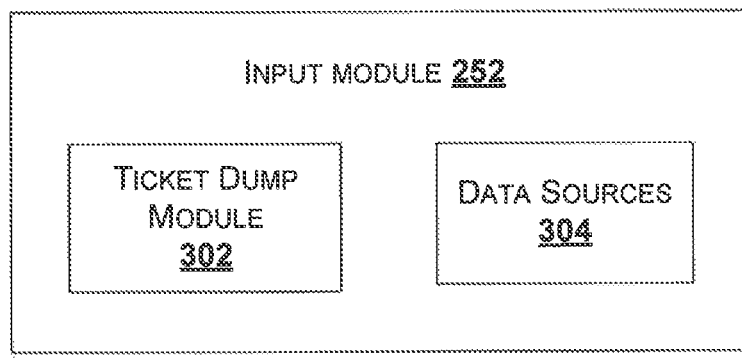
FIG. 3A illustrates a block diagram of an input module in accordance with an embodiment of the present disclosure.

The sub modules of the input module 252 are illustrated in FIG. 3A. The sub modules of the input module 252 includes a ticket dump module 302, and one or more data sources 304, also referred as data sources. The ticket dump module 302 receives input data from one or more user devices 106, which includes a ticket ID 212, a ticket number 214, a ticket title 216, a problem description 220 and a resolution description 222 associated with each of the plurality tickets. The ticket dump module 302 stores the data associated with the plurality of tickets in an inbuilt memory (not shown in FIG.), for a predefined period, which may range from one month to six months. Also, the ticket dump includes a problem description 220, and a resolution description 222 associated with each of the plurality of tickets. Further, each of the plurality of tickets in the ticket dump includes a resolution date 224, resolution time 226 and any other data associated with the ticket.

The data sources 304 receives data from one or more data sources, which is a predefined support level of the enterprises system 100. The data sources 304, is a predefined support level of the enterprises system 100, such as, but not limited to, level 1 (L1) and level 2 (L2) resources for resolving the tickets assigned. The data received by the data sources 304 includes parameters such as, but not limited to, resolution date 224, resolution time 226 and the like.

Figure 3B:
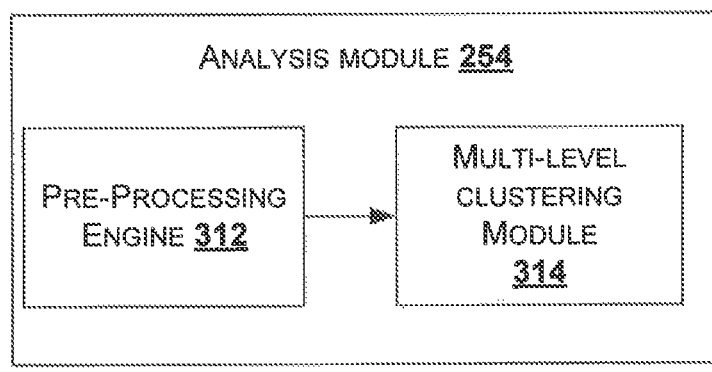
FIG. 3B illustrates a block diagram of an analysis module in accordance with an embodiment of the present disclosure.

Referring to FIG. 2, the analysis module 254 may be responsible for processing the input data associated with the plurality of tickets to obtain a structured data 228 associated with each of the plurality of tickets, in an embodiment of the present disclosure. The sub modules of the analysis module 254 are illustrated in FIG. 3B. The sub modules of the analysis module 254 includes pre-processing engine 312 and multi-level clustering module 314.

The pre-processing engine 312 performs preprocessing of the input data to obtain a structured data 228. The structured data 228 is obtained by filtering the ticket description 218 and resolution description 222 of the input data using at least one parameter. The filtering includes eliminating at least one parameters such as, but not limited to, URLs, numbers, generic stop words, custom stop words, emails, special characters, date and time values. Also, the filtering includes extracting specific information based on predefined patterns and specific information required from email based patterns. Thus, the pre-processing engine 312 filters the ticket description 218 and the resolution description 222, of the input data, using one or more noun phrases to obtain a first filtered data 230 and a second filtered data 232. Also, the pre-processing engine 312 obtains a relation between the first filtered data 230 and the second filtered data 232 based on one or more issues encountered by at least one of a group, a cluster and an application. Further, the pre-processing engine 312 obtains the structured data 228 associated with each of the plurality of tickets using the first filtered data 230, the second filtered data 232 and one or more issues, also referred as error indicators.

The multi-level clustering module 314 performs clustering of the tickets from the ticket dumps. In an embodiment, the multi-level clustering module 314 performs clustering of the structured data 228. The multi-level clustering module 314 maps data associated with the first filtered data 230 and the second filtered data 232 based on a plurality of first error indicators 234, to obtain a first cluster group 236. Also, the multi-level clustering module 314 maps data associated with the first filtered data 230 and the second filtered data 232 based on a plurality of second error indicators 238 encountered by a user, to obtain a second cluster group 240. Thereafter, the multi-level clustering module 314 maps each of the error indicators associated with the first cluster group 236 and the second cluster group 240 based on a resolution obtained to generate a third cluster group 242.

For example, considering a ticket raised by a user associated with the user device 106-1 for a browser issue, from the user device 106-1. Let the ticket description 218 provided by the user be "browser crashed and not working from yesterday". From the ticket dumps it is obtained that, the resolution team provided a resolution description 222 as "needs to reinstall the browser".

The enterprise system 100 parses the ticket dumps on the ticket description 218 and the resolution description 222 as follows:

Browser (Noun phrase)—not working, crashed (error indicator)

Browser (Noun-phrase)—reinstall the browser (resolution)

Also, obtains a time stamp as Yesterday (Timestamp).

For this ticket, the cluster is limited to a noun phrase i.e. browser which is associated with error indicator such as, crashed or not working.

Hence, the cluster will be the "browser". The next cluster related to the "browser" will be the "OS" of the given system.

Next, the relationship mapping for a single cluster, for browser is described below.

The browser includes attributes such as version and type. Also, the browser may be classified as internet explorer (IE), Chrome, Mozilla, Opera and the like.

From a single cluster the organization shall be as below:
Browser
has error symptom xxxxx
has version xxxxx
has Resolution xxxxx
 IE
 Chrome
 Mozilla
 Opera The example illustrates a relationship among the single cluster with its properties, relationships and values.

The next higher level of Cluster may be operating system (OS). The browser shall be part of the OS. The cluster arrived at fine granular level may be combined into next level of cluster in order to identify the error indicators at the higher level.

Referring to FIG. 2, the mapping module 256 maps the data at each of the plurality of clusters including a root error indicator 244 corresponding to each of the plurality of clusters. The mapping module 256 includes a modified natural language process (NLP) to obtain relationship for each cluster and error indicators, thus arriving at a textual relationship between the words in each sentence corresponding to the ticket description 218 and the resolution description 222. For each cluster, error indicators are mapped to obtain a root node with a relationship between the cluster and the error indicators.

Also, the mapping module 256 generates a relationship from a higher level of the cluster to next level of the cluster. Using the modified NLP, a higher level of relationship is obtained. For each cluster, the relationships are obtained using the analysis module 254. As the clustering is multi-level, the clusters are formed in multiple layers and aligned at a primary structure. Further, the relationships under each cluster are drilled down to understand the lower granularity levels in relationships. Hence, the relationships are structured from a higher level to a lower level. The output of the mapping module 256 may be fine granular attributes, i.e. nouns and corresponding relationships.

The analysis module 254, configured in the enterprise system 100, analyzes one or more noun phrases in the ticket description 218 and generates a first set of keywords. Next, analysis module 254 analyzes the noun phrases of the resolution description 222 and generates a second set of keywords. Further, the analysis module 254 obtains errors encountered, by users in the enterprises system, using the first set of keywords and second set of keywords separately based on the error indicators.

Now, the mapping module 256 performs mapping the error indicators to the resolution provided, based on the ticket dumps. Thereafter, arranging the relationship between the ticket, the error indicators and the resolution as one of hierarchy and sibling based relationships using the relationship. To arrive at the error indicators at the finer granule level, repeating the steps of obtaining the relationship for each cluster and error symptom. Thus, the relationship is obtained from higher level to next level, for each cluster.

For example, the ticket is "My keyboard not working", raised by the employee A.

Here the error symptom may be "not working", which is related to the keyboard.

The analysis module 254, of the enterprises system 100, analyzes the error symptom, and identifies the error as a hardware error. The mapping module 256 generates a relationship as a hierarchy shown below:
Hardware
Mouse
Keyboard
 not working
  Specific key
  All keys of the keyboard
  damaged Here, the Hardware is the root node, Mouse and Keyboard are nodes, the error symptom is not working.

The ontology engine 258 generates an ontology, at a higher level using the obtained structured relationships from the higher level to the lower level, for each cluster of the plurality of clusters. The ontology engine 258 identifies a primary root from the structured relationship of each cluster and corresponding attributes and associated values. Also, the ontology engine 258 determines relationships across the attributes and arranges the relation into a hierarchy, based on sibling-based relationships using the attributes and the values. Thereafter, obtains a primary root, corresponding hierarchical and sibling relationships for each cluster of the plurality of clusters. Thus, the ontology engine 258 generates a high-level ontology or taxonomy.

Referring to FIG. 2, the output module 260 of the enterprise system 100 performs learning operation using incremental intelligence, which is based on machine learning techniques. The output module 260 checks each of the plurality of tickets and if identifies an unknown error symptom, which is not in available in the ontology database, then the output module 260 automatically learns the cluster, and corresponding properties and relationships, which are stored in the ontology database.

Figure 4:
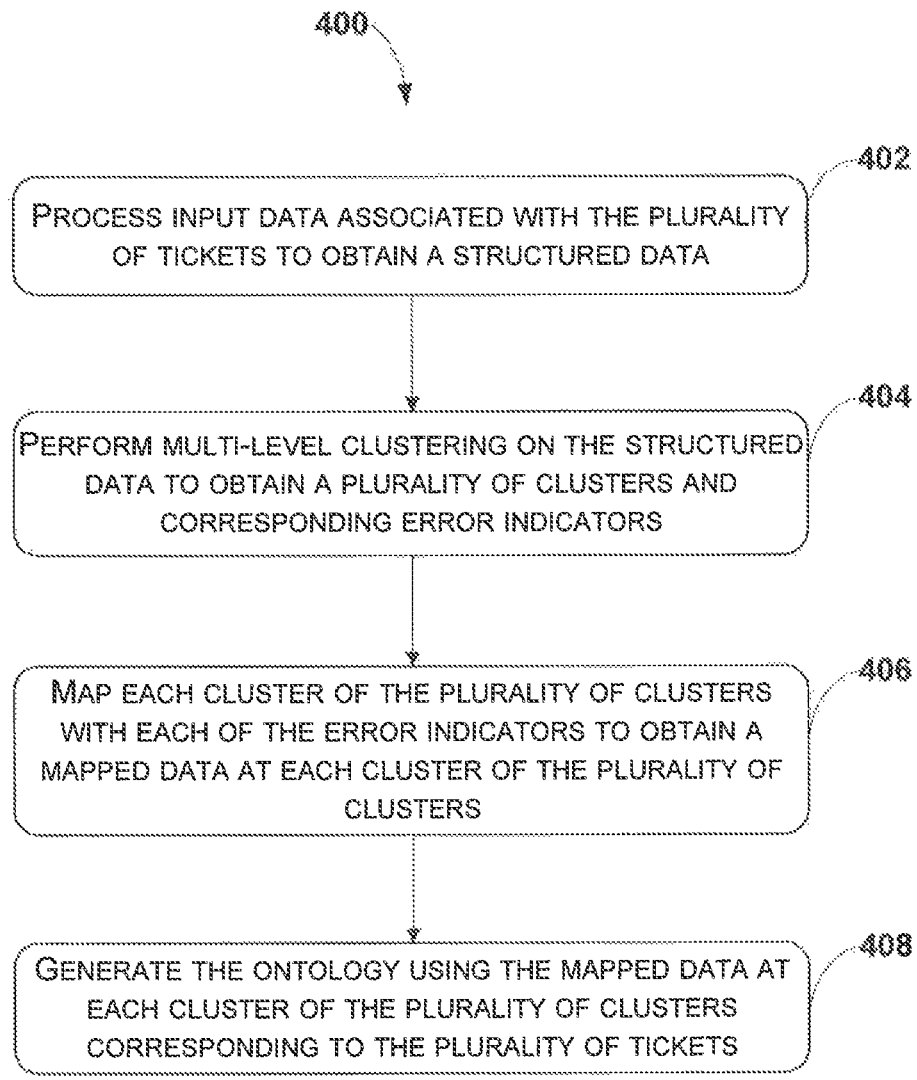
FIG. 4 shows a flowchart illustrating a method of generating an ontology based on a plurality of tickets in an enterprise system, in accordance with an embodiment of the present disclosure.

FIG. 4 shows a flowchart illustrating a method of generating an ontology based on a plurality of tickets in an enterprise system, in accordance with an embodiment of the present disclosure.

As illustrated in FIG. 4, the method 400 comprises one or more blocks for depicting an enterprise system 100 for generating an ontology based on plurality of tickets. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 402, processing input data, using the pre-processing engine 312 associated with the plurality of tickets to obtain a structured data 228 associated with each of the plurality of tickets. The structured data 228 is obtained by filtering the ticket description 218 and resolution description 222 of the input data using at least one parameter. The filtering comprises eliminating at least one parameters such as, but not limited URLs, numbers, generic stop words, custom stop words, emails, special characters, date and time values. Also, filtering the ticket description 218 and the resolution description 222, of the input data, is performed by the pre-processing engine 312 using one or more noun phrases to obtain a first filtered data 230 and a second filtered data 232. Thereafter, obtaining the structured data 228 associated with each of the plurality of tickets using the first filtered data 230, the second filtered data 233 and one or more error indicators.

At block 404, performing multi-level clustering, the multi-level clustering module 314, on the structured data to obtain a plurality of clusters and corresponding error indicators, based on one or more parameters associated with the plurality of tickets. Also, mapping data associated with the first filtered data 230 and the second filtered data 232 based on a plurality of first error indicators 234, is performed by the multi-level clustering module 314, to obtain a first cluster group 236. Also, mapping data associated with the first filtered data 230 and the second filtered data 232 based on a plurality of second error indicators 238 encountered by a user, is performed the multi-level clustering module 314, to obtain a second cluster group 240. Thereafter, the mapping each of the error indicators associated with the first cluster group 236 and the second cluster group 240 based on a resolution obtained, by the multi-level clustering module 314, to generate a third cluster group 242. Thus, obtaining structured data 228 associated with each cluster of the plurality of clusters.

At block 406, mapping each of the plurality of clusters with each of the error indicators, is performed by the mapping module 256, to obtain a mapped data at each cluster of the plurality of clusters. The mapping module 256 obtains relationship for each cluster and error indicators. For each cluster, error indicators are mapped to obtain a root node with a relationship between the cluster and the error indicators. Thereafter, generating a relationship from a higher level of the cluster to next level of the cluster is performed by the mapping module 256. Hence, the relationships are structured from a higher level to a lower level.

At block 408, generating the ontology, by the ontology engine 258, using the mapped data at each cluster of the plurality of clusters, corresponding to the plurality of tickets. Also, obtaining a structured relationship from the higher level to the lower level, is performed the ontology engine 258, for each cluster of the plurality of clusters and identifies a primary root from the structured relationship of each cluster. Thus, the ontology engine 258 builds an ontology database.

Computer System

Figure 5:
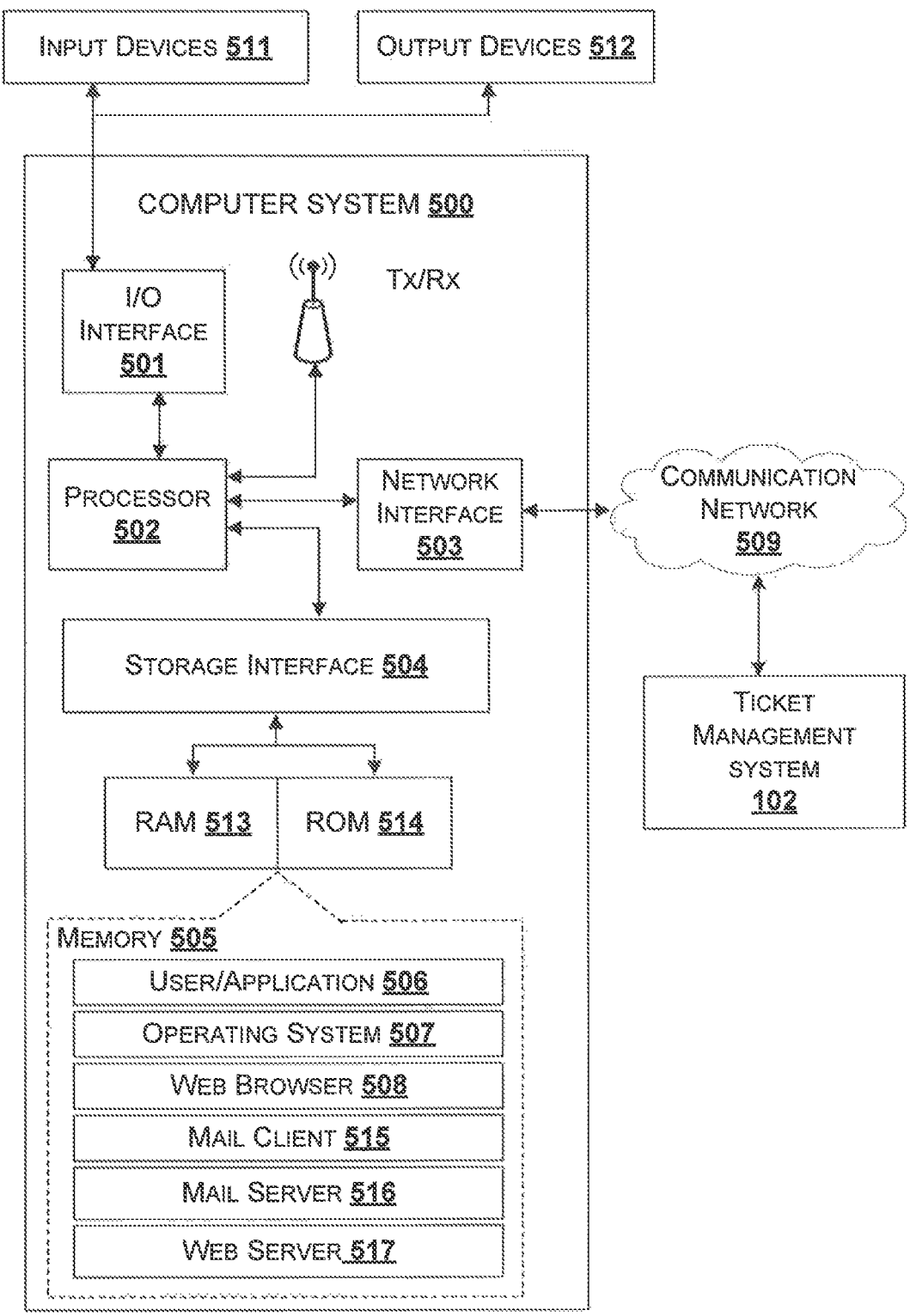
FIG. 5 illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 may be an enterprise system 100 which is used for generating an ontology based on plurality of tickets in the enterprise system 100. The computer system 500 may include a central processing unit ("CPU" or "processor") 502. The processor 502 may include at least one data processor for executing program components for executing user-generated or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with at least one of ticket management system 102 and one or more user devices 106 for receiving input data and generating an ontology based on a plurality of tickets in an enterprise system. The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application data 506, an operating system 507, web browser 508, mail client 515, mail server 516 and web server 517. In some embodiments, computer system 500 may store user/application data 506, such as the data, variables, records and the like, as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, K-Ubuntu, etc.), International Business Machines (IBM) OS/2, Microsoft Windows (XP, Vista/7/8, etc.), Apple iOS, Google Android, Blackberry Operating System (OS), or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

In some embodiments, the computer system 500 may implement a web browser 508 stored program components. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers 517 may utilize facilities such as AJAX, DHTML, Adobe Flash, JavaScript, Java, Application Programming Interfaces (APIs), etc. In some embodiments, the computer system 500 may implement a mail server 516 stored program component. The mail server 516 may be an Internet mail server such as Microsoft Exchange, or the like. The mail server 516 may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server 516 may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client 515 stored program component. The mail client 515 may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the enterprise system provides an application of multi-level clustering and collapsed dependencies based on inputs, for issue based ontology creation.

In an embodiment, the enterprise system of present disclosure provides automated process of creating ontology/taxonomy.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise. A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate or not) may be used in place of a single device/article. Similarly, where more than one device or article is described herein (whether they cooperate or not), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Enterprise system |
| 102 | Ticket management system |
| 104 | I/O interface |
| 106-1, 106-2, . . . 106-N | User devices |
| 204 | Processor |
| 206 | Memory |
| 208 | Data |
| 210 | Modules |
| 212 | Ticket ID |
| 214 | Ticket Number |
| 216 | Ticket Title |
| 218 | Ticket description |
| 220 | Problem description |
| 222 | Resolution description |
| 224 | Resolution date |
| 226 | Resolution time |
| 228 | Structured data |
| 230 | First filtered data |
| 232 | Second filtered data |
| 234 | First error indicators |
| 236 | First cluster group |
| 238 | Second error indicators |
| 240 | Second cluster group |
| 242 | Third cluster group |
| 244 | Root error indicator |
| 246 | Other data |
| 252 | Input module |
| 254 | Analysis module |
| 256 | Mapping module |
| 258 | Ontology Engine |
| 260 | Output Module |
| 262 | Other modules |
| 302 | Ticket dump module |
| 304 | Data sources |
| 312 | Pre-processing engine |
| 314 | Multi-level clustering module |
| 500 | Computer System |
| 501 | I/O Interface |
| 502 | Processor |
| 503 | Network Interface |
| 504 | Storage Interface |
| 505 | Memory |
| 506 | User/Application Data |
| 507 | Operating System |
| 508 | Web Browser |
| 509 | Communication Network |
| 511 | Input Devices |
| 512 | Output Devices |
| 513 | RAM |
| 514 | ROM |
| 515 | Mail Client |
| 516 | Mail Server |
| 517 | Web Server |

What is claimed is:

1. A method of generating an ontology based on a plurality of tickets in an enterprise system, the method comprising:

processing, by the enterprise system, input data associated with the plurality of tickets to obtain structured data associated with each of the plurality of tickets, wherein the input data comprises ticket description and resolution description associated with the plurality of tickets;

performing multi-level clustering, by the enterprise system, on the structured data to obtain a plurality of clusters and corresponding error indicators, based on one or more parameters associated with the plurality of tickets, wherein performing the multi-level clustering on the structured data comprises:

mapping data associated with the ticket description and the resolution description of the plurality of tickets based on a plurality of first error indicators encountered by an application, to obtain a first cluster group;

mapping the data associated with the ticket description and the resolution description of the plurality of tickets based on a plurality of second error indicators encountered by the same application, to obtain a second cluster group, wherein the plurality of first error indicators and the plurality of second error indicators are subset of the error indicators; and mapping each of the plurality of first error indicators associated with the first cluster group and the plurality of second error indicators associated with the second cluster group based on a resolution obtained to generate a third cluster group;

obtaining, by the enterprise system, relationship for each of the plurality of clusters with the error indicators using modified natural language processing (NLP); and generating, by the enterprise system, the ontology using the relationships for each cluster of the plurality of clusters, corresponding to the plurality of tickets.

2. The method as claimed in claim 1, wherein the input data further comprises at least one of a ticket dump, one or more data sources of the enterprise system and user input data.

3. The method as claimed in claim 2, wherein the ticket dump comprises at least one of a ticket identification (ID), a ticket number, a ticket title, a problem description, and a resolution category associated with each ticket.

4. The method as claimed in claim 2, wherein each of the one or more data sources comprises a resolution date, and a resolution time.

5. The method as claimed in claim 1, wherein processing the input data to obtain the structured data comprises:

filtering the ticket description of the input data using at least one parameter associated with a ticket of the plurality of tickets to obtain first filtered data;

filtering the resolution description of the input data using the at least one parameter associated with the ticket to obtain second filtered data; and obtaining the structured data associated with each of the plurality of tickets using the first filtered data and the second filtered data.

6. The method as claimed in claim 1, wherein generating the ontology comprises grouping each of the plurality of clusters based on a root error indicator corresponding to each of the plurality of clusters.

7. The method of claim 1, wherein obtaining, by the enterprise system, relationship for each of the plurality of clusters with the error indicators using modified natural language processing (NLP), comprises:

identifying, by the enterprise system, a root node using the obtained relationship for each of the plurality of clusters with the error indicators, wherein the root node comprises a root error indicator corresponding to each of the plurality of clusters;

generating, by the enterprise system, a relationship from a higher level of the cluster to next level of the cluster using the root node; and aligning, by the enterprise system, the relationships for each of the plurality of clusters from a higher level to a lower level.

8. An enterprise system for generating an ontology based on a plurality of tickets, the enterprise system comprising:

a processor; and a memory, communicatively coupled to the processor, wherein the memory stores processor-executable instructions, which, on execution, causes the processor to:

process input data associated with the plurality of tickets to obtain structured data associated with each of the plurality of tickets, wherein the input data comprises ticket description and resolution description associated with the plurality of tickets;

perform multi-level clustering on the structured data to obtain a plurality of clusters and corresponding error indicators, based on one or more parameters associated with the plurality of tickets, wherein performing the multi-level clustering on the structured data comprises:

mapping data associated with the ticket description and a resolution description of the plurality of tickets based on a plurality of first error indicators encountered by an application, to obtain a first cluster group;

mapping the data associated with the ticket description and the resolution description of the plurality of tickets based on a plurality of second error indicators encountered by the same application, to obtain a second cluster group, wherein the plurality of first error indicators and the plurality of second error indicators are subset of the error indicators; and mapping each of the plurality of first error indicators associated with the first cluster group and the plurality of second error indicators associated with the second cluster group based on a resolution obtained to generate a third cluster group;

obtain relationship for each of the plurality of clusters with the error indicators using modified natural language processing (NLP); and generate the ontology using the relationships for each cluster of the plurality of clusters, corresponding to the plurality of tickets.

9. The enterprise system as claimed in claim 8, wherein the input data further comprises at least one of a ticket dump, one or more data sources of the enterprise system and user input data.

10. The enterprise system as claimed in claim 9, wherein the ticket dump comprises at least one of a ticket identification (ID), a ticket number, a ticket title, a problem description, and a resolution category associated with each ticket.

11. The enterprise system as claimed in claim 9, wherein each of the one or more data sources comprises a resolution date, and a resolution time.

12. The enterprise system as claimed in claim 8, wherein to process the input data to obtain the structured data, the instructions cause the processor to:

filter the ticket description of the input data using at least one parameter associated with a ticket of the plurality of tickets to obtain first filtered data;

filter the resolution description of the input data using the at least one parameter associated with the ticket to obtain second filtered data; and obtain the structured data associated with each of the plurality of tickets using the first filtered data and the second filtered data.

13. The enterprise system as claimed in claim 8, wherein to generate the ontology using the mapped data at each cluster of the plurality of clusters, the instructions causes the processor to group each of the plurality of clusters based on a root error indicator corresponding to each of the plurality of clusters.

14. A non-transitory computer readable medium including instructions stored thereon that when processed by at least one processor cause an enterprise system to perform acts of:

processing input data associated with the plurality of tickets to obtain structured data associated with each of a plurality of tickets, wherein the input data comprises ticket description and resolution description associated with the plurality of tickets;

performing multi-level clustering on the structured data to obtain a plurality of clusters and corresponding error indicators, based on one or more parameters associated with the plurality of tickets, wherein performing the multi-level clustering on the structured data comprises:

mapping data associated with the ticket description and the resolution description of the plurality of tickets based on a plurality of first error indicators encountered by an application, to obtain a first cluster group;

mapping the data associated with the ticket description and the resolution description of the plurality of tickets based on a plurality of second error indicators encountered by the same application, to obtain a second cluster group, wherein the plurality of first error indicators and the plurality of second error indicators are subset of the error indicators; and mapping each of the plurality of first error indicators associated with the first cluster group and the plurality of second error indicators associated with the second cluster group based on a resolution obtained to generate a third cluster group;

obtaining relationship for each of the plurality of clusters with the error indicators using modified natural language processing (NLP); and generating the ontology using the relationships for each cluster of the plurality of clusters, corresponding to the plurality of tickets.

15. The medium as claimed in claim 14, wherein the input data further comprises at least one of a ticket dump, one or more data sources of the enterprise system and user input data.

* * * * *